United States Patent [19]
Lavis et al.

[11] Patent Number: 5,967,563
[45] Date of Patent: *Oct. 19, 1999

[54] QUICK RELEASE FOR A VACUUM CLEANER POWERHEAD

[75] Inventors: Gerry Lavis, Cambridge; Marvin Lewis, Burlington; Laurie G. Wilford, Cambridge, all of Canada

[73] Assignee: WCI Canada, Inc., Cambridge, Canada

[ * ] Notice: This patent is subject to a terminal disclaimer.

[21] Appl. No.: 08/936,106

[22] Filed: Sep. 23, 1997

Related U.S. Application Data

[63] Continuation-in-part of application No. 08/538,244, Oct. 3, 1995, Pat. No. 5,685,044.

[51] Int. Cl.⁶ .................................................. A47L 9/02
[52] U.S. Cl. ............................ 285/7; 285/119; 285/282; 285/316; 285/330; 15/415.1
[58] Field of Search .............................. 285/7, 282, 119, 285/316, 330; 15/415.1

[56] References Cited

U.S. PATENT DOCUMENTS

| | | |
|---|---|---|
| 1,337,288 | 4/1920 | Stichler . |
| 2,262,585 | 11/1941 | Irmischer ............................ 285/282 X |
| 2,461,024 | 2/1949 | Baumgardner . |
| 2,939,728 | 6/1960 | Bitel . |
| 3,184,776 | 5/1965 | Vermeulen ............................. 285/7 X |
| 3,351,359 | 11/1967 | Ferraris . |
| 3,569,903 | 3/1971 | Brishka . |
| 3,722,927 | 3/1973 | Miska . |
| 4,114,927 | 9/1978 | Butchu . |
| 4,134,605 | 1/1979 | Guhne et al. . |
| 4,618,195 | 10/1986 | Keane . |
| 4,758,023 | 7/1988 | Vermillion . |
| 4,787,117 | 11/1988 | Westergren . |
| 4,880,258 | 11/1989 | Tillman et al. . |
| 4,964,189 | 10/1990 | Rau et al. ............................... 285/7 X |
| 4,984,330 | 1/1991 | Berfield et al. .......................... 285/7 X |
| 5,039,133 | 8/1991 | Albrecht ....................................... 285/7 |
| 5,158,327 | 10/1992 | Rowe . |
| 5,380,051 | 1/1995 | Breuhan . |
| 5,685,044 | 11/1997 | Lavis et al. ............................. 285/7 X |

FOREIGN PATENT DOCUMENTS

| | | |
|---|---|---|
| 1288205 | 9/1991 | Canada . |
| 1066637 | 4/1967 | United Kingdom . |

*Primary Examiner*—Dave W. Arola
*Attorney, Agent, or Firm*—Pearne, Gordon, McCoy & Granger LLP

[57] ABSTRACT

A quick release for a vacuum cleaner having a nozzle and a wand for providing suction to the nozzle comprises a tubular connector to be received by the nozzle. A resilient latch on the wand is received in an opening in the tubular connector to secure releasably the wand to the tubular connector. A biased sleeve is movable axially along the tubular connector. The sleeve has a cam surface to urge the latch inwardly to an extent to clear the opening against the bias when the sleeve is moved axially to permit the withdrawal of the wand from the tubular connector.

13 Claims, 11 Drawing Sheets

5,967,563

QUICK RELEASE FOR A VACUUM CLEANER POWERHEAD

RELATED APPLICATION

This application is a continuation in part of U.S. application Ser. No. 08/538,244, filed Oct. 3, 1995 now U.S. Pat. No. 5,685,044.

FIELD OF THE INVENTION

The present invention relates to releasable connectors and in particular to a quick release for a vacuum cleaner powerhead.

BACKGROUND OF THE INVENTION

Vacuum cleaners are well known in the art. One type of vacuum cleaner is of the canister-type and includes a canister connected to a tubular wand by way of a flexible hose. At the end of the wand is a nozzle in the form of a wheeled powerhead which includes a rotating brush driven by an electric motor. An electrical power cord extends from the powerhead and runs along the wand. The end of the power cord is connected to electrical wires embedded in the flexible hose. The wires in the flexible hose run to the canister to allow for the supply of power to the powerhead.

The releasable connection between the wand and the powerhead is usually in the form of a spring biased latch on the wand which is received by an opening formed in a tubular connector on the powerhead. In order to release the connection, the latch must be pushed into the wand through the opening so that the wand can be pulled from the powerhead. In the past to release this type of connection, it was necessary to push manually the latch through the opening in the wand while at the same time pulling on the wand. As should be appreciated this task required dexterity and was inconvenient.

To facilitate the removal of a wand from a powerhead, alternative connections between the wand and powerhead were developed. One such design requires the wand to be rotated within the tubular connector on the powerhead to push the latch through the opening and into the wand to allow the wand to be removed from the powerhead. Although this design facilitates removal of the wand from the powerhead, difficulties are encountered due to the fact that the power cord, which runs from the powerhead to the flexible hose along the outside of the wand, becomes twisted as the wand is rotated. This requires the power cord to be disconnected from either the flexible hose or the powerhead before the wand is removed from the powerhead. Alternatively slack can be maintained in the power cord but this slack often gets in the way when using the vacuum cleaner. Also, a two-step process is required to release the wand from the powerhead in that the wand must firstly be rotated before it can be pulled axially away from the powerhead.

To deal with these problems, alternative couplings for vacuum cleaners have been developed. For example, Canadian Patent No. 1,288,205 to Whirlpool Corporation discloses a quick release wand for a canister vacuum cleaner. The quick release includes a foot operated lever to contact the latch and push it through the opening and into the wand to allow the wand to be removed from the powerhead.

U.S. Pat. No. 4,880,258 to Tillman et al. discloses a quick release for the telescoping parts of a vacuum cleaner wand. A force transfer structure is positioned on one of the parts adjacent a hole which accommodates a resilient post on another of the parts. The force transfer structure has a large planar inner surface for contacting the post to urge it through the hole when a user pushes on the force transfer structure.

U.S. Pat. No. 4,758,023 to Vermillan discloses a removable coupling for tubing such as a vacuum cleaner hose. The coupling includes a male connector which is received by a female connector. The male connector has a pair of resilient diametrically opposed projections on it. The female connector has guide channels formed in it to accommodate the projections. A pair of apertures are located at inner ends of the guide channels. When the connectors are to be engaged, the male connector is inserted into the female connector with the projections received in the channels. The male connector is then pushed into the female connector until the projections come to the end of the channels. The male connector is then rotated so that the projections snap into the apertures. The sides of the channels adjacent the apertures are configured to define cam surfaces so that when the male connector is rotated back, the projections can reenter the channels.

U.S. Pat. No. 3,351,359 to Fararris discloses an adjustable length vacuum cleaner having a wand defined by an inner wand section and an outer wand section. The inner wand section has a row of hemispherical depressions in it which receive a ball carried by the outer wand section. The inner surface of the outer wand section urges the ball into one of the depressions to inhibit relative axial movement of the wand sections. The outer wand section can be rotated to bring a space into alignment over the ball allowing the ball to be removed from the hemispherical depression. The length of the wand can then be adjusted by sliding the inner wand section axially with respect to the outer wand section.

Although these prior art patents disclose alternative connections for vacuum cleaner wands, better designs are desired to facilitate the connection and release of the wand from the vacuum cleaner powerhead. It is therefore an object of the present invention to provide a novel quick release for a vacuum cleaner and a vacuum cleaner incorporating the same.

SUMMARY OF THE INVENTION

According to one aspect of the present invention there is provided a quick release for a vacuum cleaner having a nozzle and a wand for providing suction to the nozzle comprising;

a tubular connector to be connected to said nozzle;

a resilient latch on said wand to be received in an opening in said tubular connector to secure releasably said wand to said tubular connector; and a sleeve movable axially along said tubular connector, said sleeve having a cam surface to urge said latch inwardly to clear said opening upon axial movement thereof to permit withdrawal of the wand from the tubular connector.

In one embodiment, it is preferred that the sleeve is biased and must be moved against the bias to bring the cam surface into contact with the latch. It is also preferred that the cam surface is constituted by a projection integrally formed on the inner surface of the sleeve and accommodated in a groove formed in the outer surface of the tubular connector. It is also preferred that a spring is accommodated in a recess formed in the tubular connector below the groove accommodating the projection, the spring acting against the sleeve to resist its axial movement thereby constituting the bias. A second projection is integrally formed on the sleeve below the first projection and acts against the spring when the sleeve is moved axially. To facilitate the application of force to the sleeve to thereby cause the sleeve to move along the tubular connector, it is preferred that the sleeve includes an outwardly projecting flange adjacent one of its ends which may be engaged by the operator's hand or foot.

Preferably, the tubular connector and the wand carry cooperating releasable electrical terminal housings carrying cooperating electrical terminals which move into mating engagement when the wand and tubular connector are secured.

According to another aspect of the present invention there is provided a vacuum cleaner nozzle assembly comprising:

a wand having a resilient latch thereon;

a nozzle to be coupled to said wand; and a quick release acting between said wand and said nozzle, said quick release including a tubular connector connected to said nozzle and having an opening therein to accommodate said resilient latch to secure releasably said wand to said tubular connector; and a sleeve movable axially along said tubular connector, said sleeve having a cam surface to urge said latch inwardly to clear said opening upon axial movement thereof to permit withdrawal of said wand from said tubular connector.

According to yet another aspect of the present invention there is provided a vacuum cleaner comprising:

a canister;

a flexible hose having one end thereof connected to said canister;

a wand connected to another end of said flexible hose;

a nozzle in the form of a powerhead; and a quick release acting between said wand and said nozzle, quick release including a tubular connector connected to said nozzle and having an opening therein to accommodate said resilient latch to secure releasably said wand to said tubular connector; and a sleeve movable along said tubular connector, and a sleeve movable along said tubular connector, said sleeve having a cam surface to urge said latch inwardly to clear said opening upon axial movement thereof to permit the withdrawal of the wand from the tubular connector.

According to a still further aspect of this invention there is provided a rotatable connection between the tubular connector and the powerhead to permit 90° rotation of the handle relative to the powerhead. A cord guide is provided on the tubular connector to maintain attachment of the cord to the tubular connector during such rotation.

The present invention provides advantages in that the quick release allows the wand to be removed from the nozzle quickly and easily. Also, its design allows the quick release to be retrofitted on existing vacuum cleaner.

BRIEF DESCRIPTION OF THE DRAWINGS

An embodiment of the present invention will now be described more fully with reference to the accompanying drawings in which.

DESCRIPTION OF THE PREFERRED EMBODIMENTS

Figure 1:
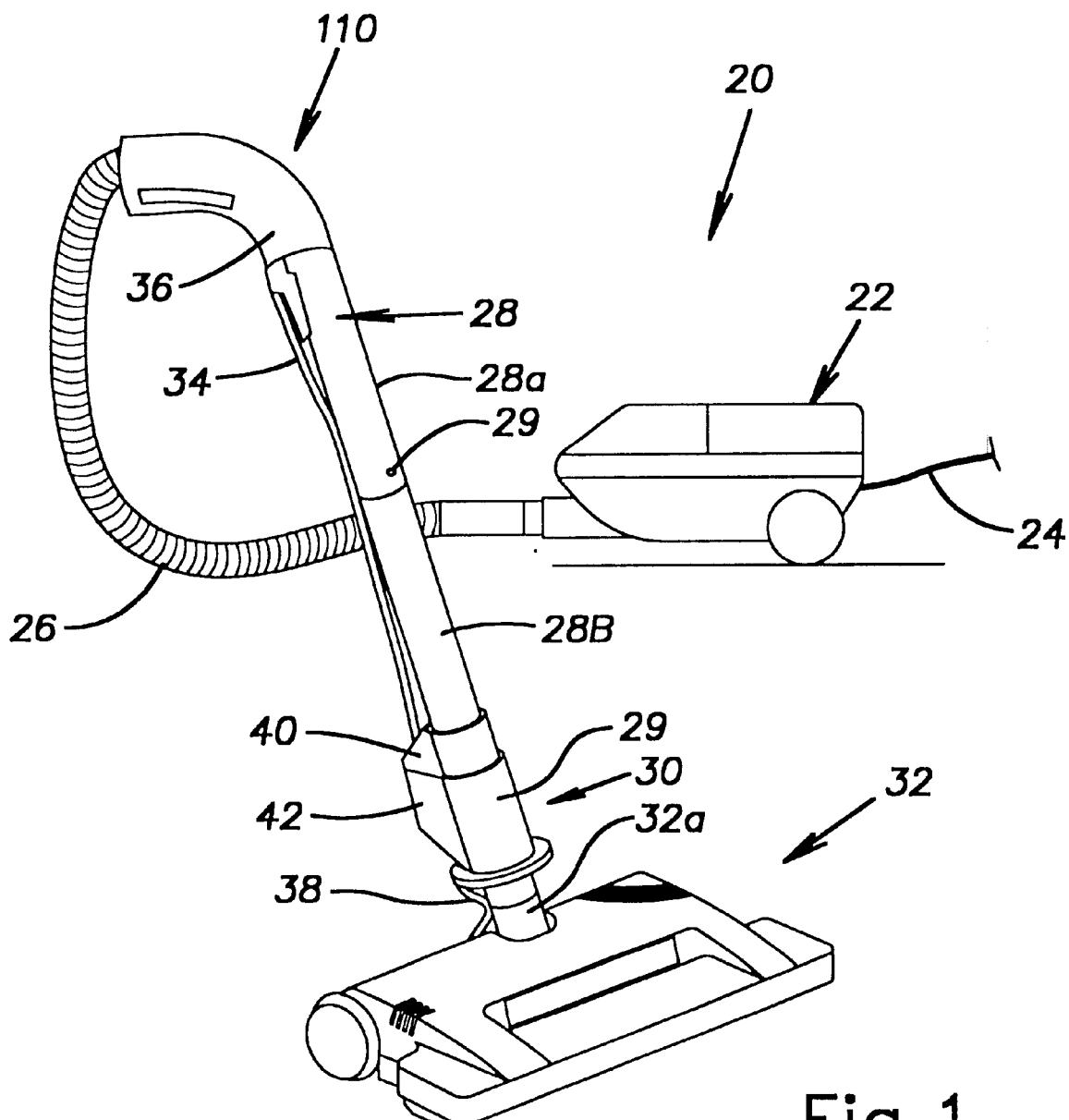
FIG. 1 is a perspective view of a vacuum cleaner.

Referring now to FIG. 1, a vacuum cleaner is shown and is generally indicated by reference numeral 20. Vacuum cleaner 20 includes a canister 22 having a power cord 24 to connect the vacuum cleaner to a household power supply. A flexible hose 26 is connected to the canister 22 and leads to a wand 28. The wand 28 includes an upper wand section 28a and a lower wand section 28b connected together by a conventional spring biased button 29. A quick release 30 acts between the wand 28 and a swivel connecter 32a on a wheeled powerhead 32 to secure releasably the wand and the powerhead. The powerhead 32 accommodates a rotary brush and an electric motor (not shown) for rotating the brush.

Embedded in the flexible hose 26 are electrical wires that are connected to the power cord 24 through electrical connections in the canister 22. A power cord 34 is connected to the electrical wires in the flexible hose 26 via a terminal 36 and runs along the outside of the wand 28. The power cord 34 extends to an electrical terminal housing 40 forming part of the quick release 30. The terminal housing 40 accommodates an electrical terminal 34a (FIG. 4) in the form of a plug at the end of the power cord 34. A second power cord 38 having an electrical terminal 38a in the form of a plug is accommodated in an electrical terminal housing 42 also forming part of the quick release 30. The power cord 38 runs along the outside of swivel connector 32a and leads to the powerhead 32. With the cooperating electrical terminal housings 40 and 42 aligned and brought together, the complimentary electrical terminals 34a and 38a are brought into engagement allowing power to be supplied from the canister 22 to the powerhead to rotate the brush. At the same time, the canister 22 creates suction through the flexible hose 26, wand 28, the swivel connector 32c, and the powerhead 32 to pick up dirt and debris from the surface over which the powerhead 32 is wheeled.

Figure 2:
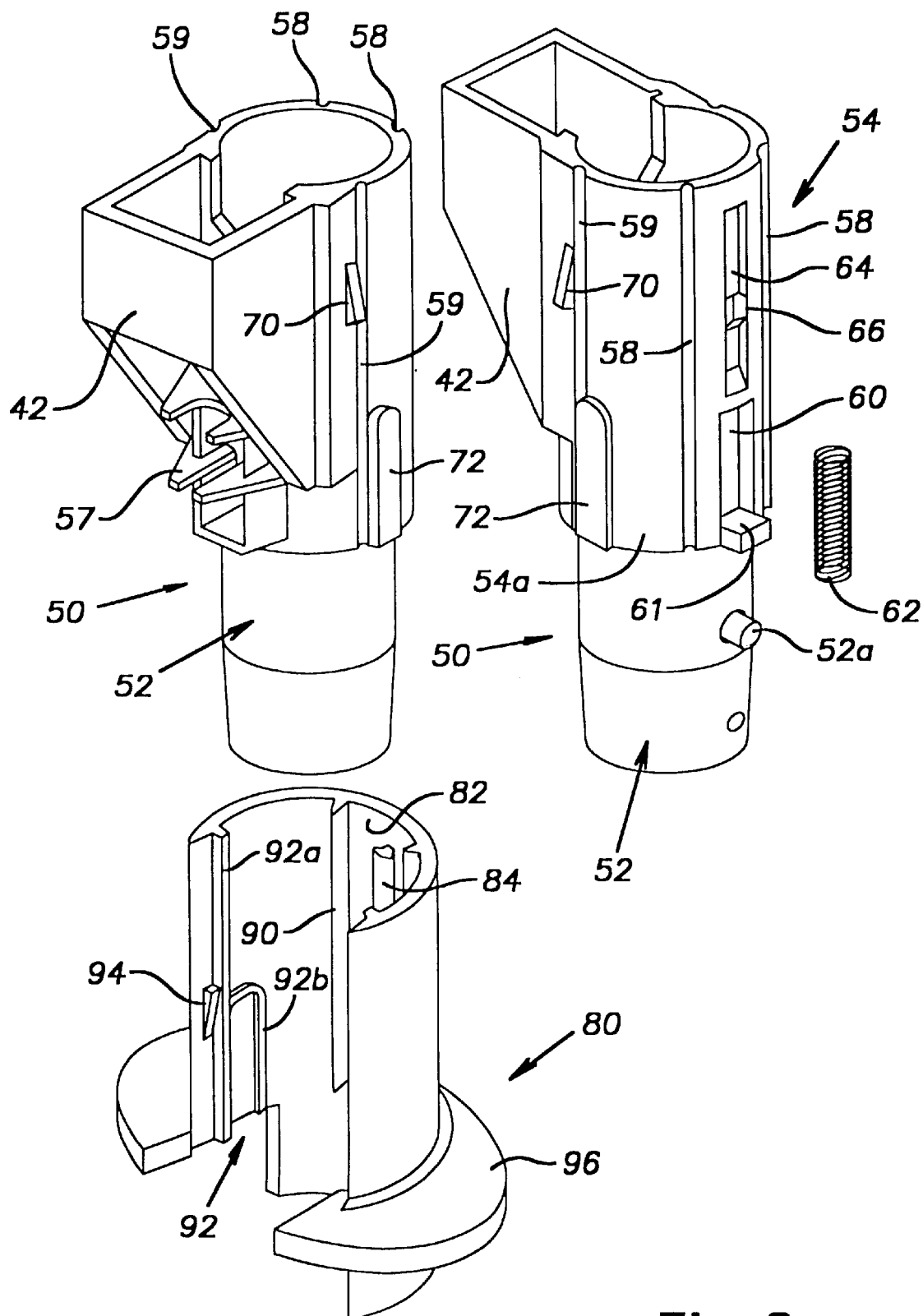
FIG. 2 is an exploded perspective view of a quick release forming part of the vacuum cleaner of FIG. 1.
Figure 3:
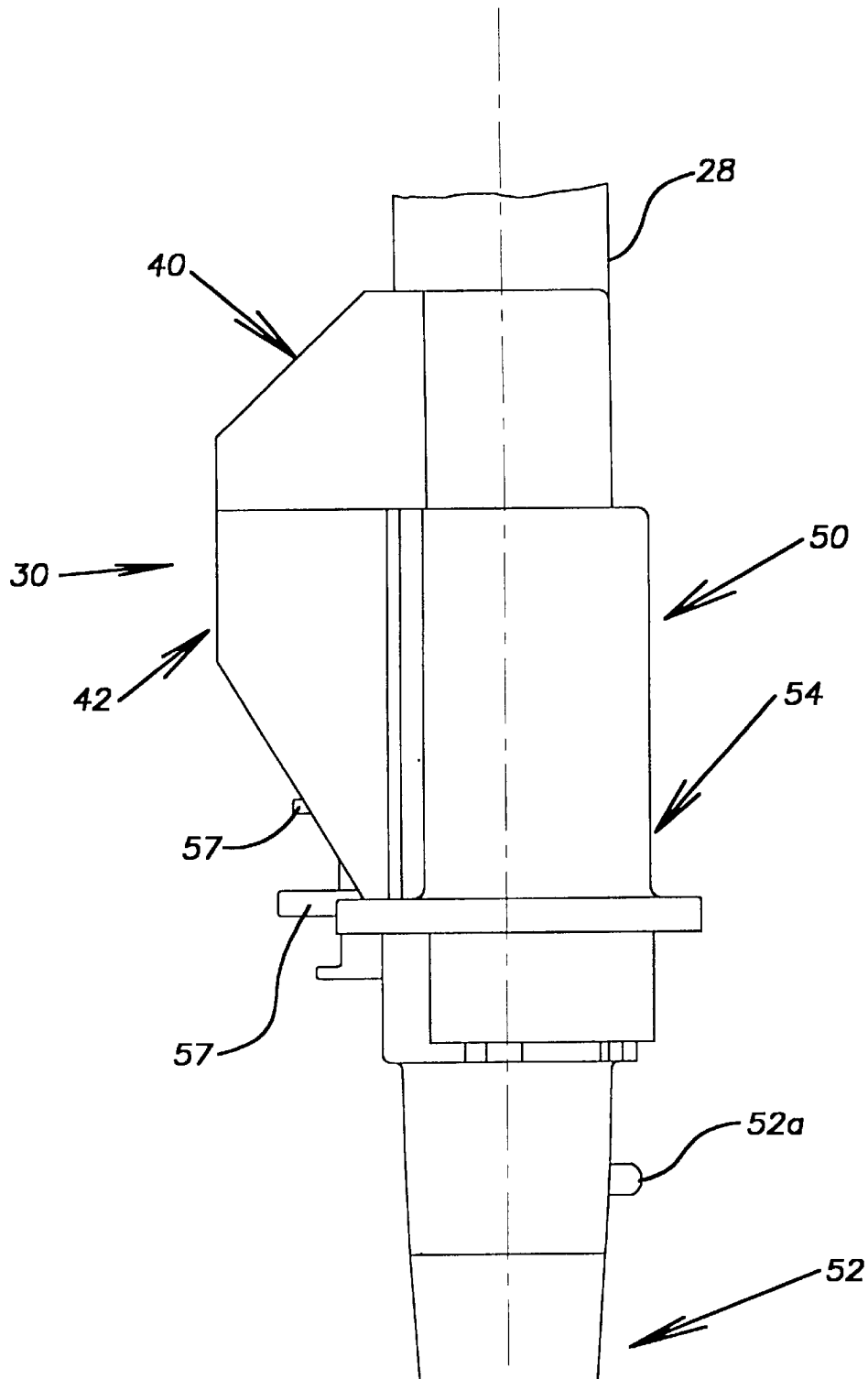
FIG. 3 is a side elevation of the quick release illustrated in FIG. 2.
Figure 4:
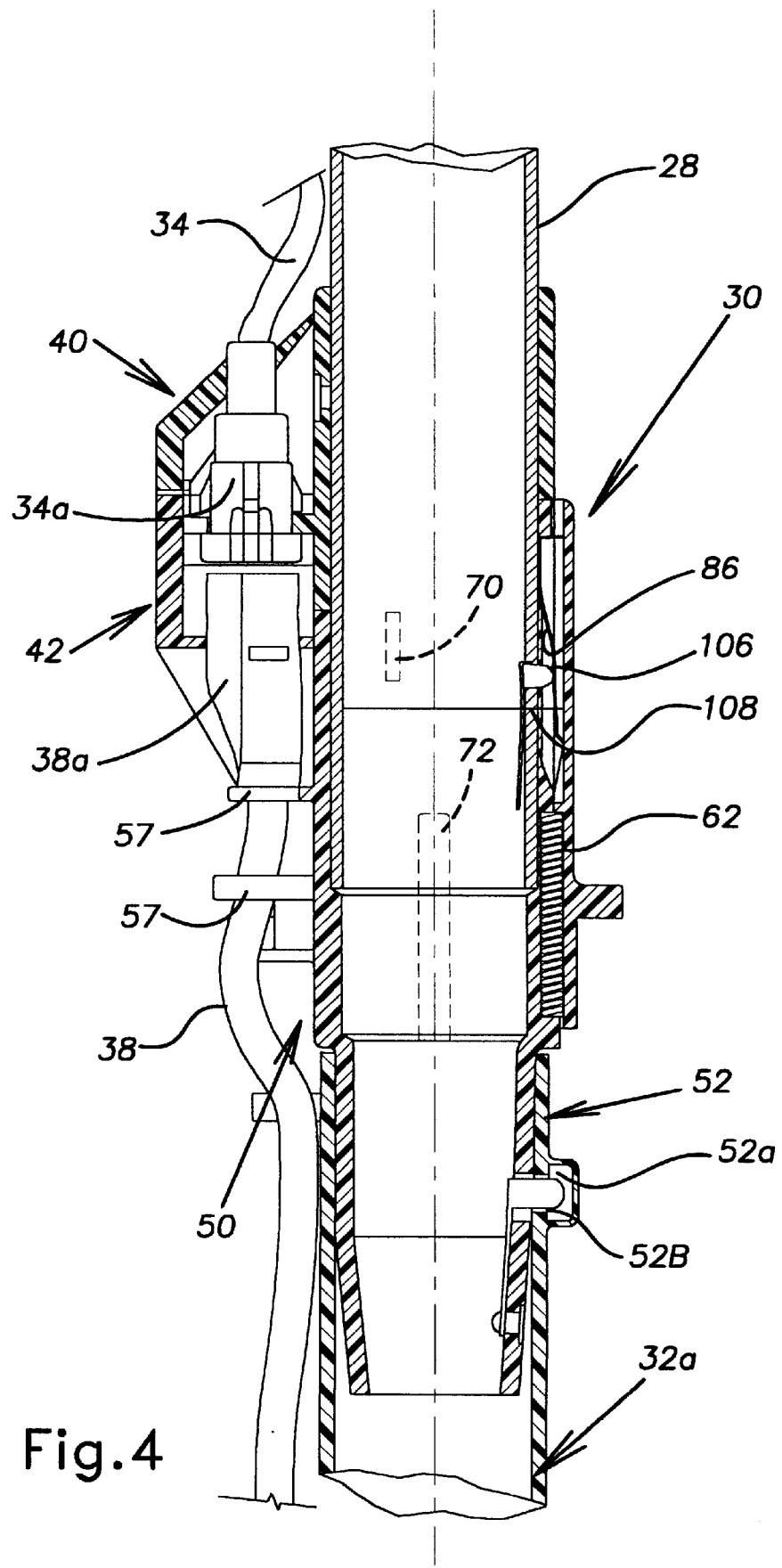
FIG. 4 is a cross-sectional view of the quick release of FIG. 2.

Referring now to FIGS. 2, 3 and 4, the quick release 30 is better illustrated. As can be seen, quick release includes a tubular connector 50 having a narrow lower tubular portion 52 to be received by the swivel connector 32a on the powerhead 32. Within the lower portion is a resilient latch 52a which projects through an opening therein. Latch 52a is accommodated in an opening 52b in the swivel connector 32a to secure releasably the quick release 30 to the swivel connector 32a.

Figure 5:
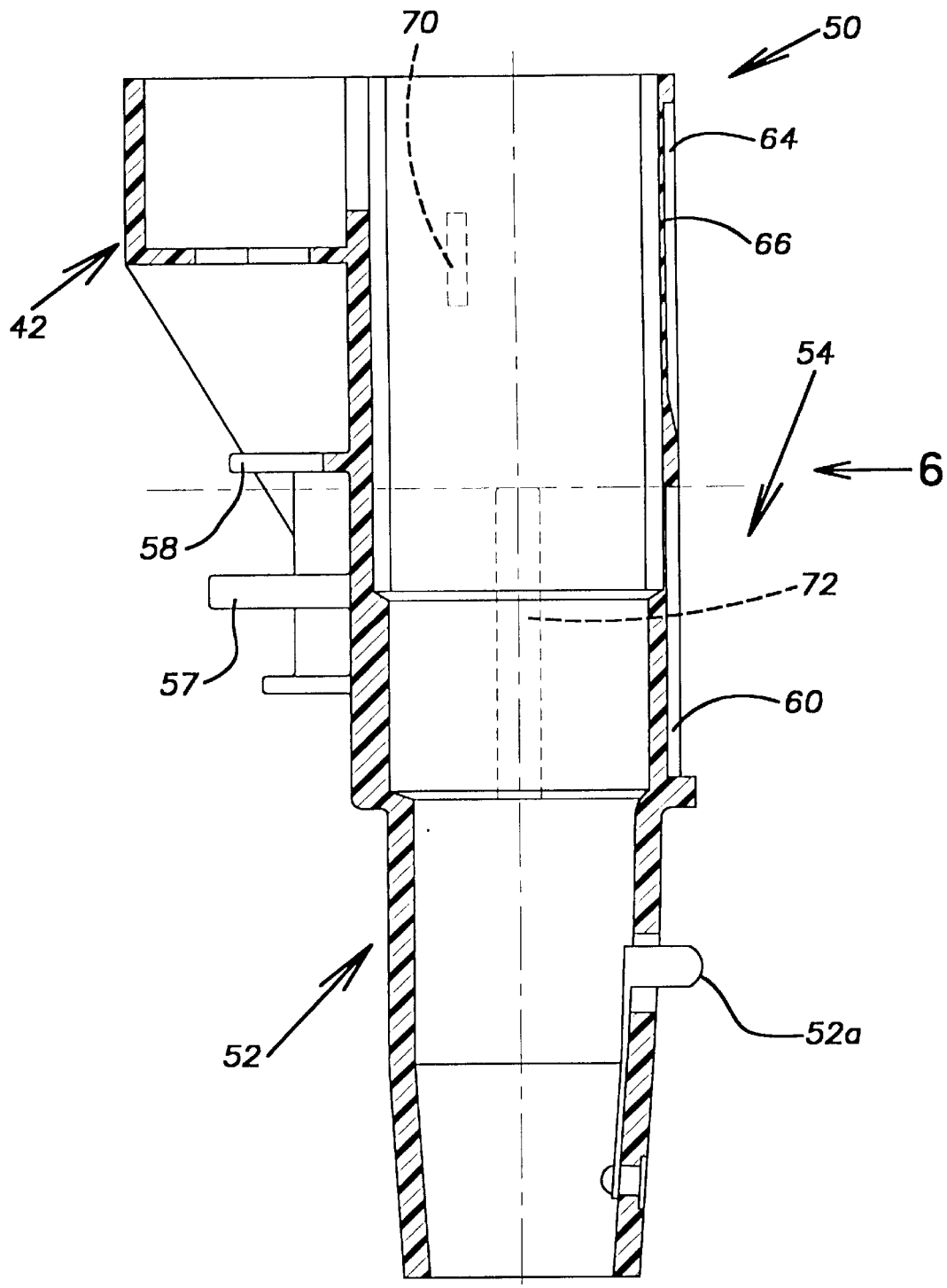
FIG. 5 is a cross-sectional view of a tubular connector forming part of the quick release of FIG. 2.
Figure 6:
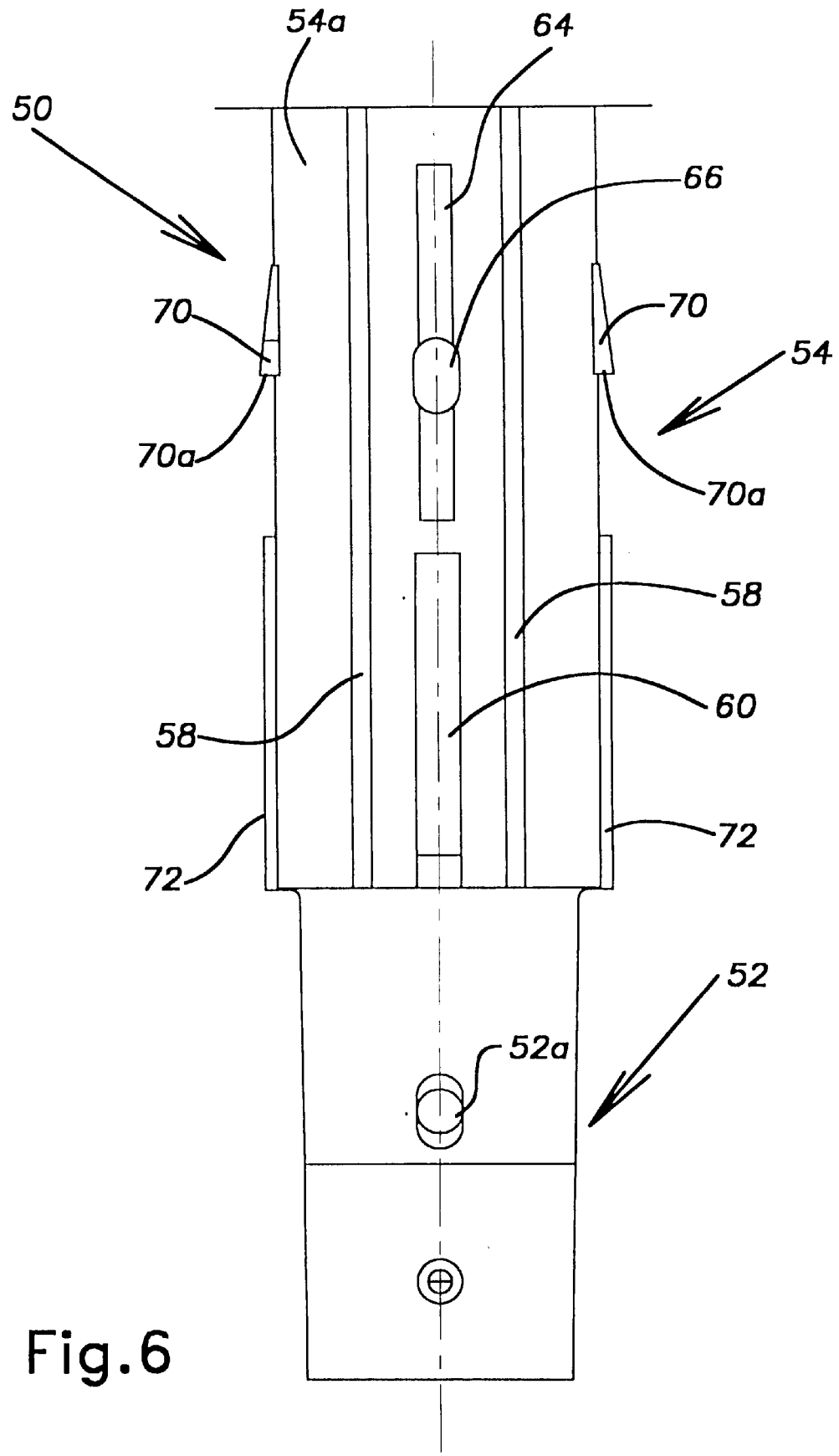
FIG. 6 is a side elevational view of the tubular connector of FIG. 5 taken in the direction of arrow 6.
Figure 7:
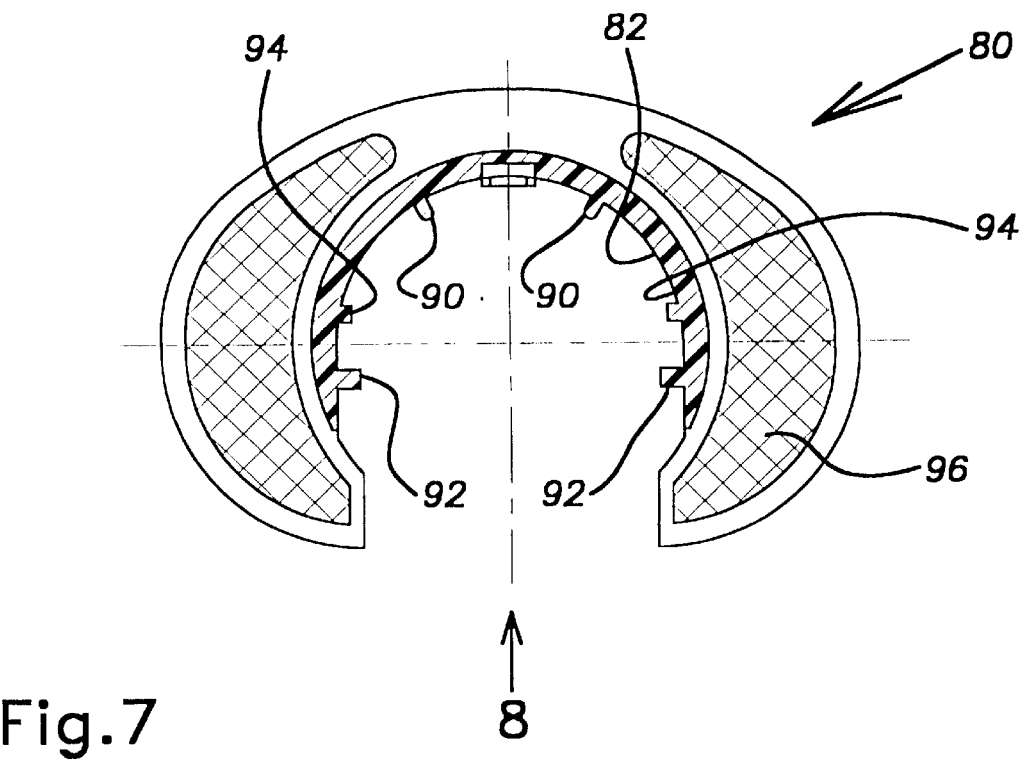
FIG. 7 is a cross-sectional view of a sleeve forming part of the quick release of FIG. 2.
Figure 8:
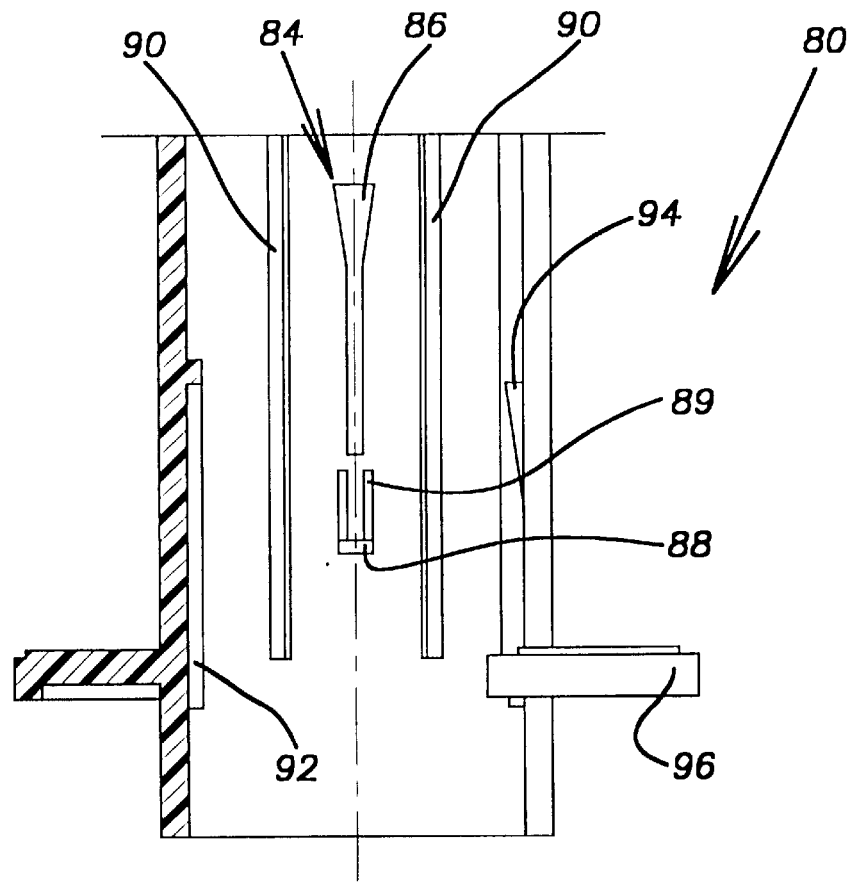
FIG. 8 is a part side elevation part cross-sectional view of the sleeve of FIG. 7 taken in the direction of arrow 8.
Figure 9:
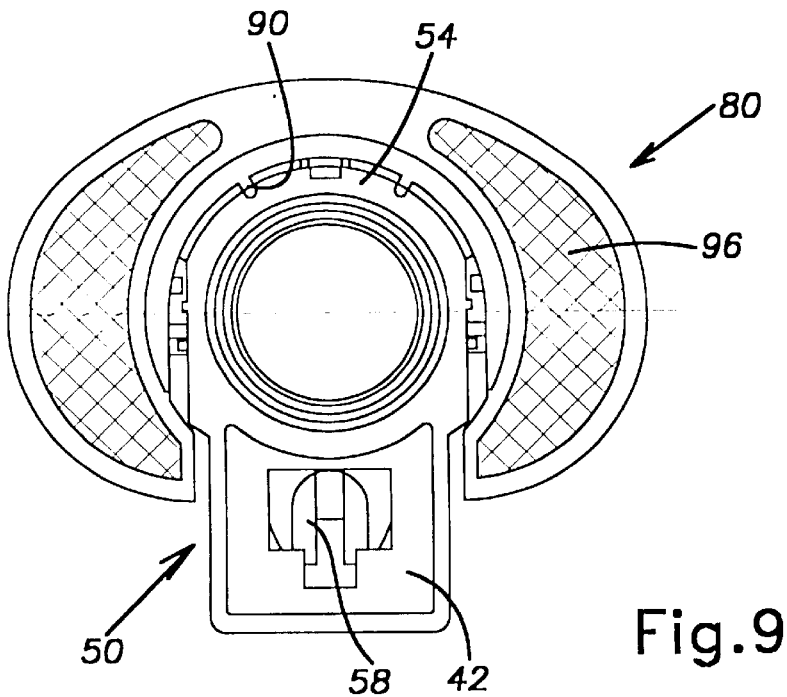
FIG. 9 is a top plan view of the sleeve of FIG. 7 cooperating with the tubular connector of FIG. 5.

Above lower portion 52 is a wider upper portion 54 (best seen in FIGS. 2, 5 and 6). Formed on the upper portion 54 of tubular connector is the electrical terminal housing 42. The electrical terminal housing 42 is adapted to receive and retain the electrical terminal 38*a* of the power cord 38. Clips 57 on the terminal housing 42 retain the power cord 38 adjacent the electrical terminal.

A plurality of grooves and recesses are formed in the outer surface 54*a* of the upper portion 54 of tubular connector 50. Specifically, a spring accommodating recess 60 is formed in the tubular connector diametrically from terminal housing 42. An outwardly projecting tab 61 extends from the outer surface 54*a* adjacent the bottom of recess 60. The recess 60 and tab 61 accommodate and support a coil spring 62. Above the spring accommodating recess 60 is a cam guide 64. An opening 66 is formed in the cam guide intermediate its length. Two sets of grooves 58 and 59 respectively are formed in the outer surface 54*a*. One groove of each set is located on an opposite side of the spring accommodating recess. The grooves 58 and 59 extend the length of upper portion 54.

Two sets of projections 70 and 72 respectively are also formed on the outer surface 54*a* of upper portion 54. The projections 70 are vertically and circumferentially spaced from projections 72. The upper projections 70, which are positioned slightly above opening 66, are in the form of wedges and define stops. The lower projections 72 also define stops and are in the form of elongate rectangles with rounded upper ends. Projections 72 extend from the bottom of the upper portion 54 to slightly beyond the top of the spring accommodating recess 60.

A part-cylindrical sleeve 80 (best seen in FIGS. 2 and 7 to 9) surrounds a portion of the tubular connector 50 and is moveable axially therealong. Sleeve 80 has a plurality of projections on its inner surface 82 to cooperate with the grooves and projections on the upper portion 54 of tubular connector 50.

In particular, a projections 84 is centrally located on the sleeve. Projection 84 presents an outwardly and upwardly inclined face defining a cam surface 86 which increases in width from bottom to top. Below the projection 84 is an abutment member 88 to contact the top of the spring 62 and compress it as the sleeve 80 is moved axially along the tubular connector 50 against the bias of the spring. A pair of spaced uprights 89 are on the abutment member to inhibit the spring 62 from pushing the sleeve 80 up and away from the surface 54*a*. Below the abutment member 88 is a spring accommodating recess 91. Circumferentially spaced elongate rectangular tongues 90 are also located on opposite sides of the projection 84 and are received by the grooves 58.

Circumferentially spaced projections 92 resembling "h's" are also formed on the inner surface 82 of the sleeve. The long stem portion 92*a* of each projection 92 is accommodated in one of the grooves 59. The inverted U-shaped portion 92*b* of each projection accommodates one of the projections 72. The projections 72 act as stops to limit the downward axial movement of the sleeve 80. Wedges 94 are also formed on the inner surface 82 of the sleeve 80 and are aligned with the wedges 70. The wedges 94 contact the wedges 70 when the sleeve 80 has been moved upwardly along the tubular connector 50 to limit upward movement of the sleeve 80. The various projections and grooves guide the axial movement of the sleeve 80 along the tubular connector while inhibiting relative rotational movement therebetween. On the outer surface of the sleeve 80 at its lower end is a flange 96 to facilitate the application of force to the sleeve causing axial movement of the sleeve along the tubular connector.

Figure 10:
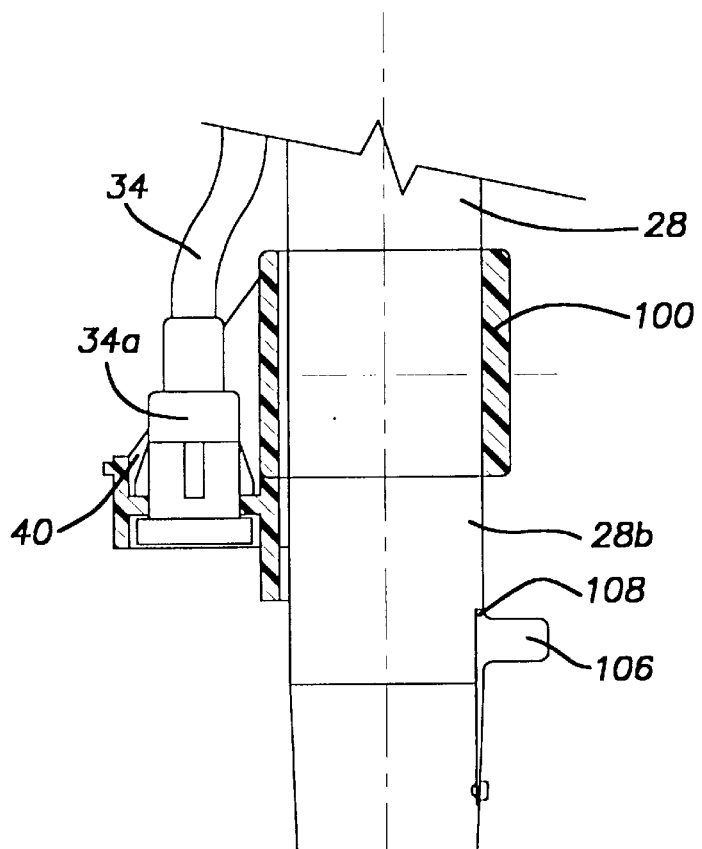
FIG. 10 is a cross-sectional view of a second tubular connector forming part of the quick release of FIG. 2.

A second tubular connector 100 is fastened to the lower wand section 28*b* (see FIG. 10) and includes electrical terminal housing 40. Within the wand section 28*b* below the tubular connector 100 is a spring biased latch 106 having a cylindrical body portion and a rounded nose portion that projects through an opening 108 in the wand 28. The latch is dimensioned to be accommodated in the opening 66 and is resilient so that is can be pushed radially inwardly.

Figure 12:
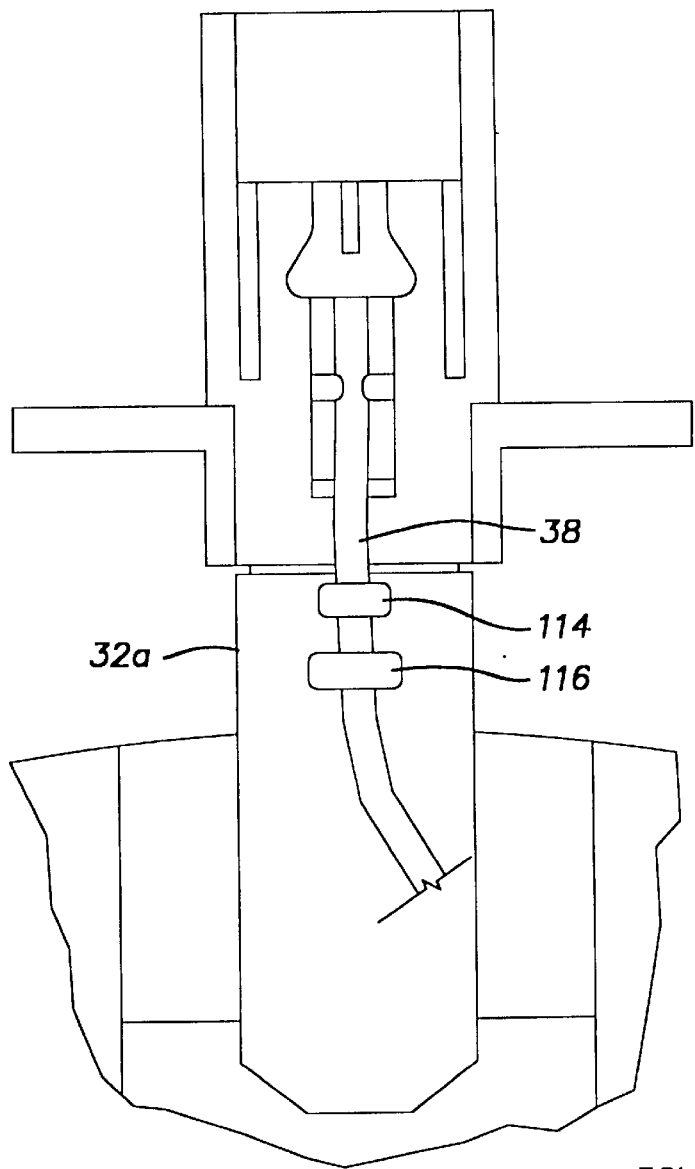
FIG. 12 is a rear elevational view of the quick release mechanism connected to the power head of a vacuum cleaner.
Figure 13:
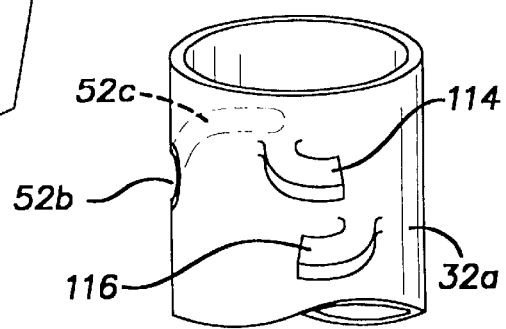
FIG. 13 is a fragmentary perspective view of the cord guide.
Figure 14:
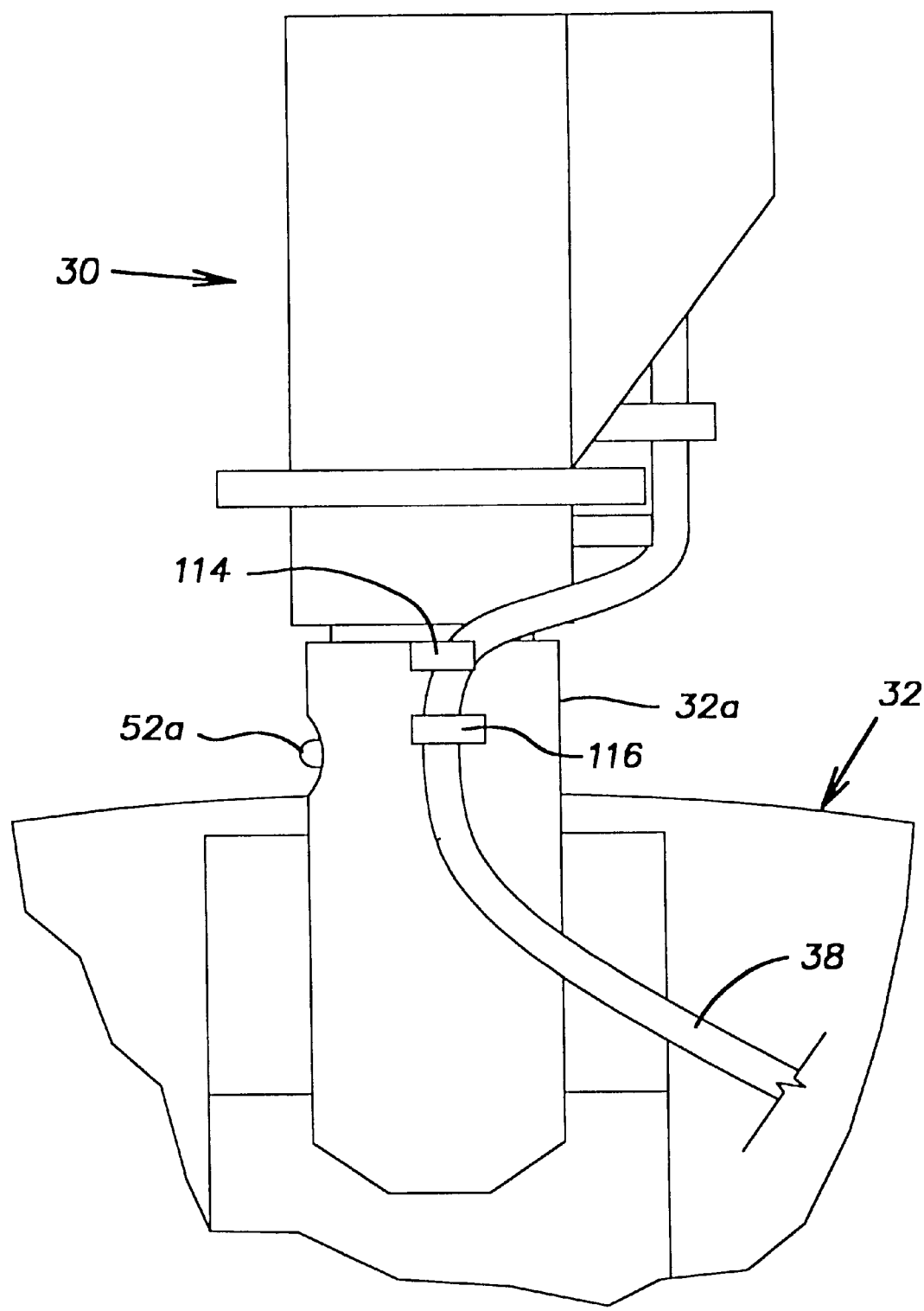
FIG. 14 is a view similar to FIG. 12 but showing the handle portion rotated 90°.

Referring particularly to FIGS. 12–14, it will be observed that the opening 52*b* is provided with a slot extension 52*c* which extends about 90° circumferentially around the swivel connector 32*a* and which has slot ends 52*d* and 52*e*. The slot extension 52*c* allows the wand 28 to be rotated counterclockwise about its longitudinal axis so that a hand grip 110 (FIG. 1) may be twisted as the wand 28 is lowered for cleaning under objects. Also, since a guard 112 is provided over the protruding latch 52*a* when it is in the opening 52*b*, the wand 28 must be rotated to the position shown in FIG. 14 to depress the latch.

During normal use, the cord 38 is retained in place against the swivel connector 32*a* by a pair of oppositely facing upper and lower guide hoods 114 and 116, respectively a slight amount of slack is provided in the cord 38 so that the cord is smoothly guided over the lower guide hook 116 as the wand 28 is rotated between the positions illustrated in FIGS. 12 and 14.

Prior to use, the lower tubular portion 52 is inserted into the swivel connector 32*a* so that the latch 52*a* is accommodated by the opening in the tube thereby securing the tubular connector 50 to the powerhead 32. The electrical terminal 38*a* on the power cord 38 is then inserted into the terminal housing 42 and the power cord 38 is pushed into the clips 57 to retain to power cord. The tubular connector 100 is fastened to the wand 28 and has the electrical terminal 34*a* of power cord 34 accommodated in its terminal housing 40. With the tubular connectors attached to the wand and tube respectively and accommodating the electrical terminals, the quick release 30 is ready for use.

In use, the wand 28 is inserted into the open upper end of the tubular connector 50 causing the latch 106 to be urged inwardly. With the electrical terminal housings 40 and 42 aligned and as they move towards one another to bring the electrical terminals 34*a* and 38*a* into engagement, the cylindrical body portion of the latch 106 is accommodated in the opening 66 securing the wand 28 to the tubular connector 50 as is illustrated in FIG. 4. With the two electrical terminals 34*a* and 38*a* in mating engagement, power can be supplied to the powerhead 32 and the powerhead can be wheeled over the floor surface to be cleaned when suction is applied to the wand 28.

Figures 11A, 11B:
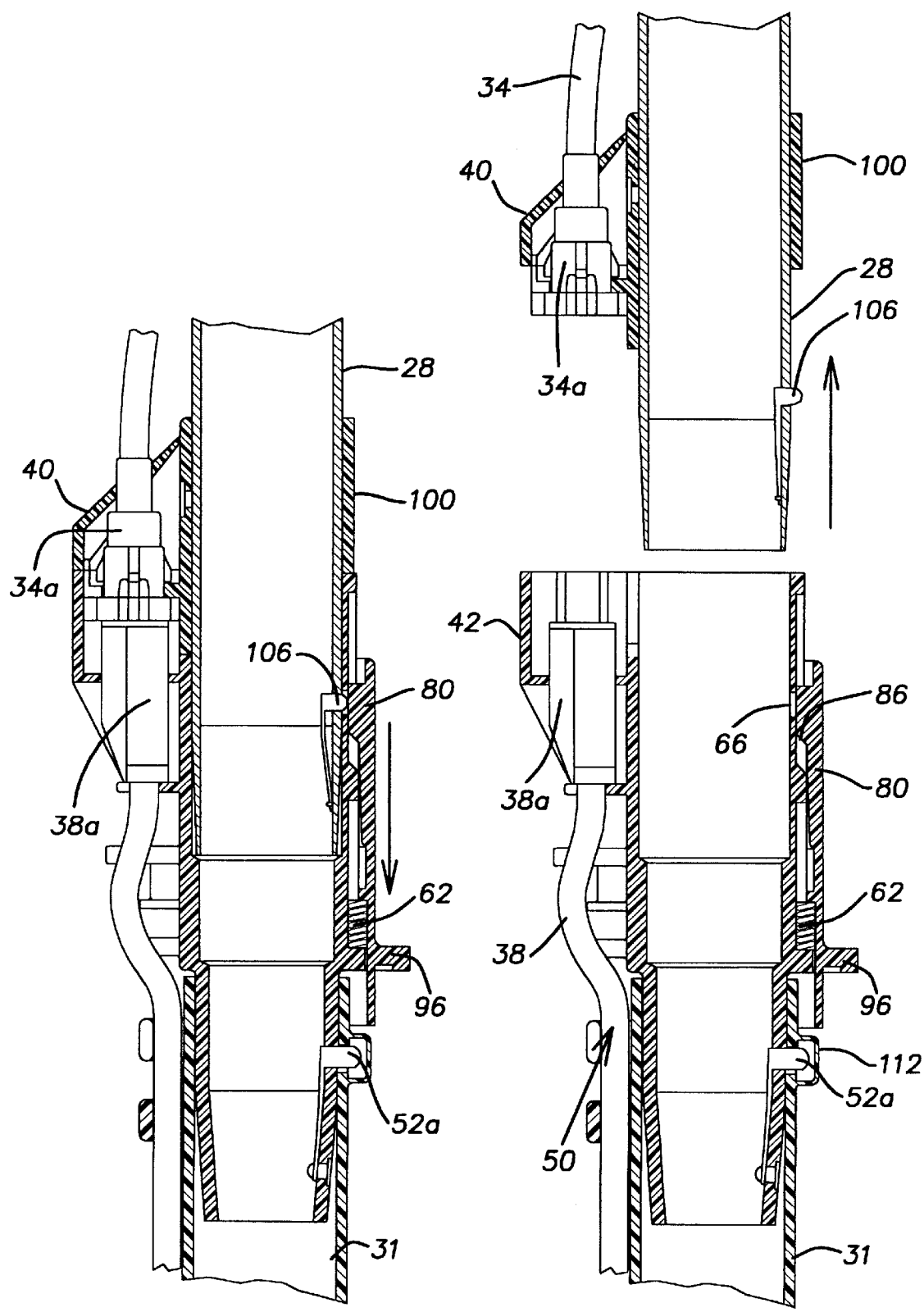
FIGS. 11a and 11b are cross-sectional views of the quick release illustrating the manner in which the quick release is released.

When it is desired to release the connection between the wand 28 and the tubular connector 50, the sleeve 80 is pushed downwardly against the bias of the spring 62 (see FIG. 11*a*). The flange 96 on the outer surface of the sleeve 80 facilitates the application of the downward force by the operator's foot. As the sleeve is moved downwardly, the abutment member 88 contacts the top of the spring 62 and forces it into compression. Movement of the sleeve downwardly also brings the cam surface 86 towards the latch 106 which has its cylindrical body portion projecting through the opening 66. The lower part of the projection 84 clears the latch 106 but as the sleeve is moved further along the tubular connector 50, the inclined cam surface 86 acts against the latch 106 pushing it toward the position illustrated in FIG. 11*a*.

Once the sleeve 80 has been pushed along the tubular connector 50 sufficiently to push the latch 106 radially inwardly to a position wherein its cylindrical body portion is spaced radially inwardly from the opening 66 and the rounded nose portion is in a position to engage the opening 66, thereby permitting the latch 106 to be cammed radially inwardly to clear the opening 66 upon application of upward force to the wand 28, the wand 28 can then be pulled from the tubular connector 50 separating the electrical terminals 34a and 38a and removing the wand 28 from the powerhead 32 (see FIG. 11b). The cooperating projections 72 and 92 limit the axial downward movement of the sleeve 80 but of course allow the sleeve to be moved enough to urge the latch 106 into the wand 28. After the wand 28 has been removed from the tubular connector 50, the sleeve 80 can be released and is returned to the position illustrated in FIG. 4 under the influence of the spring 62 which assumes its uncompressed state. The cooperating wedges 70 and 94 prevent further movement of the sleeve 80 under the influence of the spring after the sleeve has been released.

The quick release 30 can be integrally formed on the wand 28 and powerhead 32 or may be releaseably attached to the wand and the powerhead. This allows the quick release to be incorporated into a vacuum cleaner during its manufacture or retrofitted to an existing vacuum cleaner.

As should be apparent, the quick release 30 allows the wand to be released from the powerhead with ease and in a simple manner. Although a preferred embodiment of the present invention has been described, it should be realized by those of skill in the art that modifications and variations may be made to the present invention without departing from the scope thereof as defined by the appended claims.

What is claimed:

1. A quick release for a vacuum cleaner having a nozzle and a hollow wand adapted to be connected to a suction source for providing suction to the nozzle comprising:
   a tubular connector to be connected to said nozzle;
   a first resilient latch on said wand to be received in an opening in said tubular connector to secure releasably said wand to one end of said tubular connector;
   a sleeve moveable axially along said tubular connector, said sleeve having a cam surface to urge said latch inwardly to an extent to clear said opening upon axial movement of said sleeve and upon axial force applied to said wand to permit the withdrawal of the wand from the tubular connector;
   another end of said tubular connector being provided with a second resilient latch; and
   a swivel connector pivotally connected to said nozzle; said second resilient latch being received in an opening in said swivel connector.

2. A quick release as defined in claim 1 further including biasing means to resist said axial movement of said sleeve.

3. A quick release as defined in claim 2 wherein said cam surface is constituted by a projection integrally formed on an inner surface of said sleeve and accommodated in a slot formed in an outer surface of said tubular connector.

4. A quick release as defined in claim 3 wherein said tubular connector and said wand carry cooperating releasable electrical terminals, said electrical terminals being in mating engagement when said wand and tubular connector are secured.

5. A quick release as defined in claim 4 further including a spring accommodated in a slot formed in said tubular connector and constituting said biasing means, said spring acting against a projection on said sleeve to bias said sleeve to a first position wherein said cam surface permits said latch to project outwardly from said opening.

6. A quick release as defined in claim 5 wherein said sleeve includes an outwardly projecting flange at one end thereof to facilitate the application of force to said sleeve causing movement of said sleeve axially along said tubular connector.

7. A quick release as defined in claim 6 wherein said sleeve and tubular connector include cooperating guides to permit axial movement of said sleeve along said tubular connector and inhibit relative rotational movement therebetween.

8. A quick release as defined in claim 7 further including stop means to limit axial movement of said sleeve along said tubular connector to a second position wherein said cam surface urges said latch inwardly.

9. A quick release as defined in claim 8 wherein said stop means are in the form of cooperating projections on said sleeve and tubular connector.

10. A quick release as defined in claim 9 wherein cooperating projections are provided on said sleeve and tubular connector to limit axial movement of said sleeve in opposite directions.

11. A quick release for a vacuum cleaner having a nozzle and a hollow wand adapted to be connected to a suction source for providing suction to the nozzle comprising:
    a swivel connector attached to said nozzle;
    a tubular connector to be connected at one end to said swivel connector and at another end to said wand;
    a first resilient latch on said wand to be received in an opening in said tubular connector to secure releasably said wand to said another end of said tubular connector;
    a quick release connector releasably connecting said tubular connector to said swivel connector;
    said quick release connector having a first connecting portion attached to said one end of said tubular connector and a second connecting portion releasably attached to said swivel connector by a second resilient latch;
    said second resilient latch being received in a circumferentially extending slot in said swivel connector, said circumferentially extending slot having slot ends which permit a radially extending portion of said second resilient latch to travel arcuately between said ends and to thereby permit said tubular connector and said quick release connector to be rotated as a unit relative to said swivel connector and about a longitudinal axis of said tubular connector.

12. A quick release as defined in claim 11 wherein mating electrical connectors are provided in said quick release connector to provide an electrical connection between a pair of electrical power conductor cords, one of said cords extending from said quick release connector to said nozzle and being retained along said swivel connector by first and second cord guide hooks, said hooks being longitudinally spaced from each other, said first hook permitting said one of said cords to slide relative thereto upon rotation of said tubular connector relative to said swivel connector in a first direction, and said second hook permitting said one of said cords to slide relative thereto upon rotation of said tubular connector relative to said swivel connector in a second direction.

13. A quick release for a vacuum cleaner having a nozzle and a hollow wand adapted to be connected to a suction source for providing suction to the nozzle comprising;
    a swivel connector attached to said nozzle;
    a tubular connector to be connected at one end to said swivel connector and at another end to said wand;

a first resilient latch on said wand to be received in an opening in said tubular connector to secure releasably said wand to said another end of said tubular connector;

a quick release connector releasably connecting said tubular connector to said swivel connector;

said quick release connector having a first connecting portion attached to said one end of said tubular connector and a second connecting portion releasably attached to said swivel connector by a second resilient latch;

said second resilient latch being received in a circumferentially extending slot in said swivel connector, said circumferentially extending slot having slot ends which permit a radially extending portion of said second resilient latch to travel arcuately between said ends and to thereby permit said tubular connector and said quick release connector to be rotated as a unit relative to said swivel connector and about a longitudinal axis of said tubular connector;

mating electrical connectors in said quick release connector to provide an electrical connection between a pair of electrical power conductor cords, one of said cords extending from said quick release connector to said nozzle and being retained along said swivel connector by a pair of cord guide hooks, said hooks permitting said one of said cords to slide relative thereto upon rotation of said tubular connector relative to said swivel connector.

* * * * *